June 29, 1926.

G. A. DUERLER, JR

PRESSURE GAUGE WITH DEFLATOR

Filed Dec. 30, 1924

1,590,966

INVENTOR:
Gustave A. Duerler Jr.
By Attorneys,
Fraser, Myers & Manley

Patented June 29, 1926.

1,590,966

UNITED STATES PATENT OFFICE.

GUSTAVE A. DUERLER, JR., OF SAN ANTONIO, TEXAS, ASSIGNOR TO A. SCHRADER'S SON, INC., OF NEW YORK, N. Y., A CORPORATION OF NEW YORK.

PRESSURE GAUGE WITH DEFLATOR.

Application filed December 30, 1924. Serial No. 758,887.

The present invention relates to pressure gauges for pneumatic tires and aims to provide certain improvements therein.

Riding comfort in an automobile and the life of the tires thereon depend to a great degree upon the tires being properly inflated, which means that tires of given sizes should be inflated to predetermined pressures. To insure the best results, it is customary for the operator to test the pressures within his tires with any conventional form of pressure gauge. To obtain proper inflation of the tire, the common practice is to first inflate the tire by applying to the tire valve an inflating coupling, which is connected with a source of compressed air, until it is thought sufficient air has been introduced into the tire, whereupon the coupling is removed from the tire valve and a pressure gauge applied thereto in order to ascertain the pressure within the tire. The type of gauge almost universally used for this purpose is the stay-up variety in which the pressure indicator is maintained in indicating position after the gauge is removed from the tire valve. If, upon gauging the tire the pressure therein is found to be too low, additional air is introduced into the tire and the gauging operation repeated after the indicating member of the gauge has been reset to zero. These operations are repeated until the gauge indicates proper inflation or over-inflation. If overinflated, some of the air must be vented from the tire, and this is usually accomplished by holding the tire valve unseated with a match stick or the screw driver projection on the valve cap or any other means conveniently at hand until it is thought that sufficient air has been vented, whereupon the pressure is again tested. These operations are repeated until the desired pressure within the tire is obtained. Obviously, the repeated resetting of the indicating member of the gauge to its zero position and the deflating operations by a separate deflating means are time consuming, and where a deflating means is not conveniently at hand, additional time is consumed in locating one and the patience of the operator is thereby taxed.

According to the present invention, the operations of gauging and deflating a tire are facilitated by combining in a single device a pressure gauge and deflator, the latter being so positioned with relation to the movable indicating member of the pressure gauge as to provide for the resetting of the indicating member to its zero position when the deflator is pressed into engagement with the valve pin to unseat the valve. In carrying out my invention, the deflator is preferably formed as a central projection which extends outwardly from the top of the movable indicator of the gauge, at which location it is always conveniently at hand and ready for immediate use. The invention also includes other features of novelty which will be hereinafter more fully described.

In the accompanying drawings I have shown several embodiments of my invention, wherein—

Figure 2:
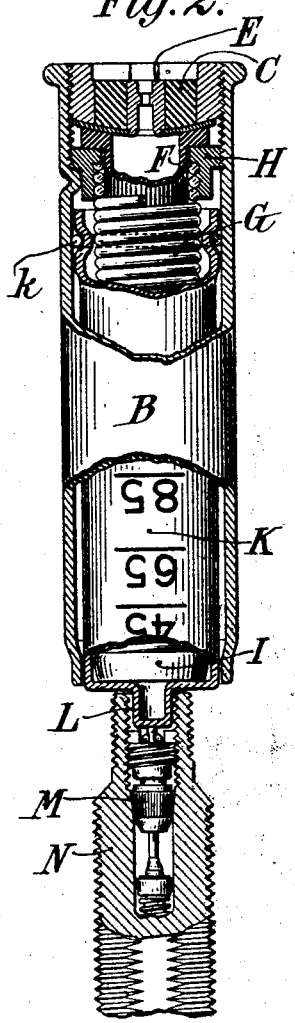
Fig. 2 is a longitudinal section partly in elevation of the pressure gauge and deflator applied in deflating position to a pneumatic tire valve.
Figure 1:
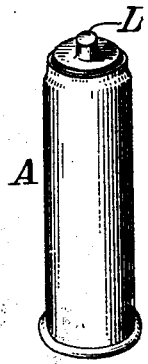
Figure 1 is a perspective view of a tire pressure gauge embodying my invention.

Referring first to Figs. 1 and 2 of the drawings, let A indicate the pressure gauge and deflator as a whole, which comprises a cylindrical casing B having mounted at the foot end thereof a press-on seat C and a tire valve depressor E. Mounted within the casing B is an elastic thimble F surrounded by a loading spring G, one end of which is fixed to an anchor nut H adjacent the foot portion of the casing, and the other end of which is connected to a plunger I adapted to move outwardly upon distension of the thimble F when air under pressure is admitted thereto. In its outward movement the plunger I carries with it a pressure indicating member or sleeve K, which telescopes with the casing B and is adapted to be held in pressure indicating position by a split spring ring $k$ after the plunger I is retracted by the spring G. The indicating member K may be returned to its zero position by applying a slight force, directed inwardly, against the top of said member. The pressure gauge as thus far described is the conventional "Schrader universal tire gauge".

Figure 3:
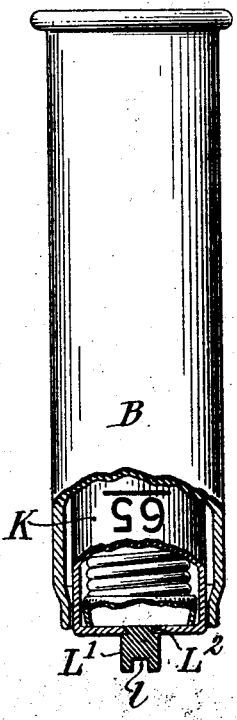
Fig. 3 is an elevation, partly in section, of a modification, the gauge being shown in an inverted position.
Figure 4:
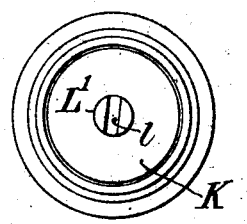
Fig. 4 is a top plan view of the gauge shown in Fig. 3.
Figure 5:
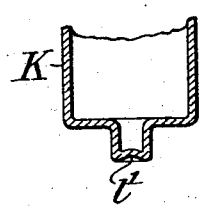
Fig. 5 shows a further modification of the invention.

According to the present invention, in order to facilitate the deflating or venting of air from a tire, the top of the pressure indicating member K is formed with a central outwardly extending projection of a diameter to freely pass within the opening at the outer end of a tire valve stem. As shown in Fig. 2, the projection is indicated by the letter L, and said projection is shown in the position holding the valve of the valve insides M mounted within the tire valve N unseated. The deflator L, it will be understood, may be either integrally formed with the pressure indicating member, as shown in Figs. 1 and 2, wherein it is pressed out of the top of the sheet metal shell which constitutes the indicating member during the process of forming the shell, or it may be formed as a separate element or pin L' and secured to the top of the indicating member, as shown at L² in Fig. 3. To insure against slipping of the deflator pin when applied to a valve, the top of the pin may be provided with a center depression, as shown at $l$ in Fig. 3. Obviously a similar depression may be provided in the hollow pin L, as shown in Fig. 5 and lettered $l'$.

In addition to having the deflator and pressure gauge incorporated in a single structure and thus insuring the presence of a deflator when gauging a tire, the specific location and arrangement of the deflator with respect to the gauge, serves the additional function of resetting the pressure indicating member to its zero position when the deflator is pressed into engagement with the valve pin, thus rendering the gauge ready for a future gauging operation. The device as herein disclosed, it will be appreciated, is very simple, compact and may be used for either gauging or deflating a tire, as desired, by merely turning the gauge within the hand.

While I have shown and described certain preferred embodiments of my invention, it will be understood that other modifications thereof may be resorted to without departing from the spirit of the invention.

What I claim is:

1. A pressure gauge for pneumatic tires or the like comprising a cylindrical casing and a cylindrical sheet metal indicating member telescoping with the casing having an integral hollow central projection extending outwardly from the top of the indicating member, said projection being of a diameter to enter the open end of a tire valve and larger than the diameter of the valve pin within such tire valve.

2. A pressure gauge comprising an elongated casing, an indicating member telescoping with the casing and a projection extending outwardly from the top of the indicating member adapted to engage the top of a tire valve pin, the top of the projection having a central depression therein adapted to fit the top of said valve pin.

In witness whereof, I have hereunto signed my name.

GUSTAVE A. DUERLER, Jr.